Jan. 15, 1957    P. A. HENNING    2,777,995
BROAD BAND BARRETTER MOUNT
Filed Jan. 23, 1953

PHILIP A. HENNING
INVENTOR.

BY *Lyon & Lyon*

ATTORNEYS

2,777,995
BROAD BAND BARRETTER MOUNT

Philip A. Henning, Los Angeles, Calif., assignor to Gilfillan Bros. Inc., Los Angeles, Calif., a corporation of California Application January 23, 1953, Serial No. 332,844

1 Claim. (Cl. 333—22)

An object of the present invention is to provide means and techniques whereby a single device may be used to measure power accurately in a large range, i. e. broad band, of microwave frequencies.

In general, the present invention contemplates the use of a circuit element which changes in impedance depending upon the amount of current passing therethrough or the voltage applied thereto. By these means, power is measured in terms of impedance or resistance. Such circuit element is placed in a coaxial position in a coaxial fitting and, in conjunction with a ring-shaped resistance element which bridges the space between the inner conductor and outer sheath of the coaxial fitting, allows line matching over a wide frequency band and allows also a return for the flow of direct current. This circuit element is placed at a point where the impedance of the barretter mount is almost entirely real and, for example, 300 ohms for a 200-ohm barretter mount.

It is therefore a general object of the present invention to provide improved means and techniques whereby the above-indicated functions, operation and results may be obtained.

A specific object of the present invention is to provide an improved measuring device which is useful as such over a wide range, i. e., broad band, of microwave frequencies.

Another specific object of the present invention is to provide an improved power measuring device of this character in which the element sensitive to power, current or voltage is disposed in a coaxial position in a coaxial fitting.

Another specific object of the present invention is to provide an improved device of this character allowing operation over a wide range of frequencies and yet one which provides a return for the flow of continuous current.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1:
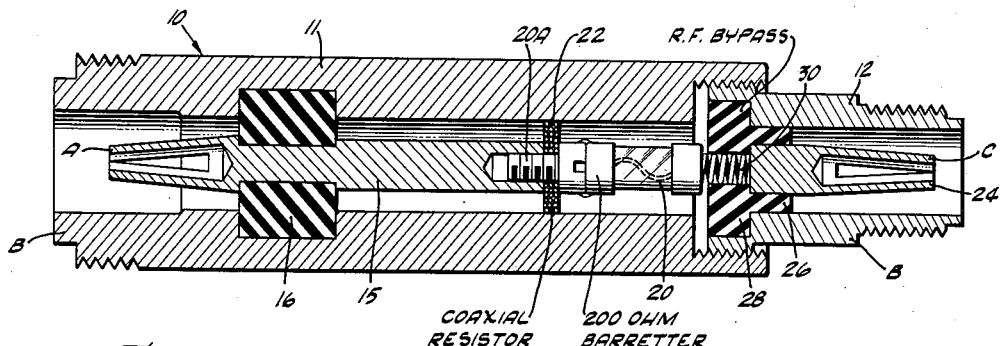
Figure 1 is a sectional view through a coaxial fitting which embodies features of the present invention.

Referring to Figure 1, there is shown therein a coaxial fitting having the general reference numeral 10. This fitting has an outer two-part tubular sleeve or sheath which comprises the sleeves 11 and 12. The sleeve 11 is internally threaded to screw-threadedly receive the sleeve 12, and in turn the sleeve 12 is externally threaded to receive, for example, the knurled nut of a conventional coaxial fitting. The outer sleeves 11, 12 are maintained at ground potential and thus may be considered to be a shield for the circuit elements disposed within the same. The left-hand end of the sleeve 10 is externally threaded so that it may, in conventional manner, receive a conventional type of coaxial fitting. The inner circular conductor 15 is maintained in coaxial relationship in the outer sleeve 11 by the circular ring 16 of high-grade insulating material 16 which has a relatively low dielectric constant and low loss at the microfrequencies which are involved here. This inner conductor 15 has a diameter which is substantially equal to the diameter of the 200-ohm barretter resistance 20. This resistance 20, which changes its impedance in accordance with the current or voltage applied thereto, has an externally threaded extension 20A which is screw-threadedly received in the inner conductor 15 with the coaxial resistance 22 sandwiched between the elements 20 and 15. This resistance 22 is ring-shaped and its outer circular periphery makes a close, snug, good electrical contact with the inner periphery of the sleeve 11.

In accordance with one important feature of the present invention, this coaxial resistor 22 is placed in a plane where the impedance of the mount is almost entirely real.

The other sleeve 12 has an inner conductor 24 which is maintained in coaxial relationship therein by the ring-shaped insulating material 26. Such material 26, being of relatively low dielectric constant and low loss of the microwave frequencies involved herein. A ring 28 of low-grade insulating material is snugly received within an annular recess of the sleeve 12 to provide a radio frequency bypass.

The compression spring 30 passes through the central aperture of the ring 28 and serves to make contact between the right-hand end of the resistance 20 and the inner conductor 24.

It is evident from the foregoing description that the resistance elements 20 and 22 may be conveniently assembled and disassembled, as desired.

Figure 2:
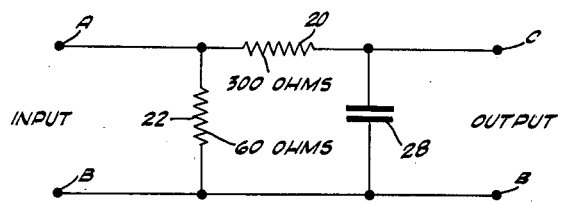
Figure 2 is a schematic representation of circuit elements which are connected in a circuit considered equivalent to the arrangement of elements illustrated in Figure 1.

The equivalent circuit for the arrangement structurally shown in Figure 1 is electrically represented in Figure 2. It is observed that the inner conductor 15 corresponds to the terminal A and that the inner conductor 24 corresponds to the terminal C. Likewise, the outer sleeves 11 and 12 correspond both to the grounded terminal B. The resistance 22 is 60 ohms. The resistance 20 is 300 ohms and is connected between the terminals A and C. The ring 28 of insulating material, which has a high dielectric constant to provide a bypass condenser, is connected between the terminals B and C. This circuitry may introduce a power loss of approximately 8 decibels, but this is not serious where large powers are involved.

Since resistance 22 is 60 ohms and resistance 20 is 300 ohms, the equivalent impedance as measured at the terminals A, B is 50 ohms so that such terminals A, B may be connected to a 50-ohm source without mismatch.

It is noted that resistance 22 is connected in one arm of a parallel circuit and that the bilaterally conducting resistance 20 and condenser 28 are serially connected in a second arm of the parallel circuit with the joint or equivalent impedance of such parallel circuit being substantially equal to the impedance of the line connectible thereto.

Although resistance 20 has a nominal value of 300 ohms, the actual magnitude of its resistance is dependent upon the current flowing therethrough or the voltage applied thereto. A measurement of the resistance of element 20 is therefore deemed to be a measure of the power applied to the terminals A, B.

Figure 3:
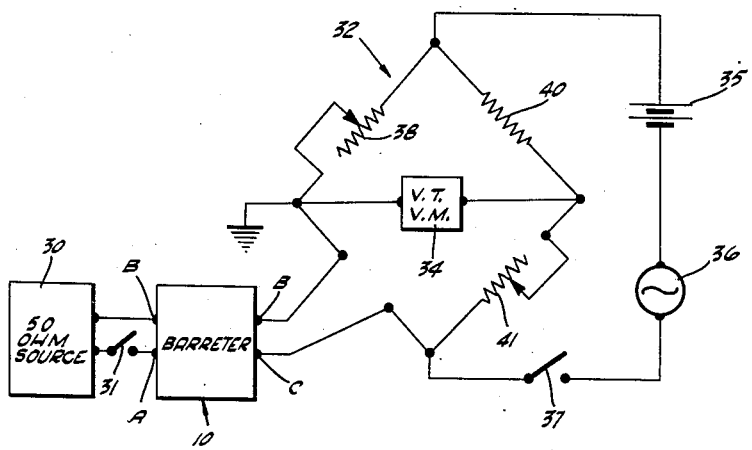
Figure 3 illustrates one manner in which the device shown in Figure 1 may be used to measure power in accordance with features of the present invention.

It is understood, of course, that there are many various techniques which may be used to measure the resistance of element 20, and the one shown in Figure 3 is considered to be exemplary of those. In Figure 3, the source of microwave frequencies is represented at 30 and is connectible through switch 31 to the terminals A, B. The terminals B, C are connected in one arm of the Wheatstone bridge 32. A vacuum tube voltmeter 34 is in the so-called "galvanometer" arm of the bridge; and the bridge is supplied with energy from both of a unidirectional source 35 and an alternating source 36, connected in series with the switch 37. Adjustable resistance 38, in a second arm of the bridge, is serially connected with the terminals B, C. The fixed resistance 40 and adjustable resistance 41 comprise, respectively, a third and a fourth arm of the bridge. In general, the resistance 38 may be adjusted to provide a predetermined or desired flow of continuous current through the resistances 20 and 22; whereas, on the other hand, the resistance 41 may be adjusted for purposes of obtaining a balance of the bridge. In other words, resistance 38 may be used for calibration purposes, while resistance 41 may be used for balancing or measurement purposes.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

Wide frequency band power measuring apparatus of the character described comprising a coaxial fitting having an outer conducting sleeve and an inner central input conductor and a central output conductor, a ring-shaped resistance mounted coaxially in said fitting between said sleeve and said input conductor and in a plane where the impedance is almost entirely real, a bilaterally conducting impedance whose magnitude is changeable with the intensity of current flow therethrough, but insensitive to changes in direction of current flow therethrough, aligned in said fitting and serially connected between said central input conductor and said central output conductor, and dielectric material coaxially disposed between said central output conductor and said sleeve and serving as an element of a radio frequency bypass condenser axially aligned in said fitting and connected between said sleeve and conductor, a source connectible between said input conductor and said outer conducting sleeve, said resistance being in one arm of a parallel circuit and said bilaterally conducting impedance and bypass condenser being serially connected in a second arm of said parallel circuit, the joint impedance of said parallel circuit being substantially equal to the impedance of said source.

References Cited in the file of this patent

UNITED STATES PATENTS

| | | |
|---|---|---|
| 2,210,381 | Rechnitzer | Aug. 6, 1940 |
| 2,498,335 | Hunt | Feb. 21, 1950 |
| 2,557,122 | Leiphart | June 19, 1951 |
| 2,590,477 | Weber et al. | Mar. 25, 1952 |
| 2,620,396 | Johnson et al. | Dec. 2, 1952 |
| 2,653,299 | Ginzton | Sept. 22, 1953 |